United States Patent
Eckmann et al.

(10) Patent No.: US 10,430,311 B2
(45) Date of Patent: *Oct. 1, 2019

(54) MEASURING EXECUTION TIME OF BENCHMARK PROGRAMS IN A SIMULATED ENVIRONMENT

(71) Applicant: International Business Machines Corporation, Armonk, NY (US)

(72) Inventors: Sascha Eckmann, Schloss Holte-Stukenbrock (DE); Thomas Gardelegen, Mainz (DE); Wolfgang Gellerich, Boeblingen (DE); Bodo Hoppe, Tamm (DE)

(73) Assignee: International Business Machines Corporation, Armonk, NY (US)

( * ) Notice: Subject to any disclaimer, the term of this patent is extended or adjusted under 35 U.S.C. 154(b) by 365 days.

This patent is subject to a terminal disclaimer.

(21) Appl. No.: 14/919,764

(22) Filed: Oct. 22, 2015

(65) Prior Publication Data

US 2016/0210214 A1 Jul. 21, 2016

Related U.S. Application Data

(63) Continuation of application No. 14/601,468, filed on Jan. 21, 2015.

(51) Int. Cl.
*G06F 11/34* (2006.01)
*G06F 11/30* (2006.01)

(52) U.S. Cl.
CPC ...... *G06F 11/3457* (2013.01); *G06F 11/3024* (2013.01); *G06F 11/3428* (2013.01)

(58) Field of Classification Search
CPC .............. G06F 18/327; G06F 11/3457; G06F 11/3024; G06F 11/3428
See application file for complete search history.

(56) References Cited

U.S. PATENT DOCUMENTS

| 6,240,376 B1 | 5/2001 | Raynaud et al. |
| 7,171,338 B1 | 1/2007 | Goguen et al. |

(Continued)

FOREIGN PATENT DOCUMENTS

| JP | WO2010001766 A1 | 1/2010 |
| JP | WO2012117746 A1 | 9/2012 |

(Continued)

OTHER PUBLICATIONS

T. J. Siegel et al., "IBM's S/390 G5 microprocessor design," in IEEE Micro, vol. 19, No. 2, pp. 12-23, Mar./Apr. 1999.*

(Continued)

*Primary Examiner* — Saif A Alhija
*Assistant Examiner* — Joshua E. Jensen
(74) *Attorney, Agent, or Firm* — Nolan M. Lawrence

(57) ABSTRACT

A simulation environment benchmarks processors to determine processor performance. A benchmark program is instrumented with a microarchitecture instruction. A first clock cycle indicative of a processor before executing the benchmark program is captured. The benchmark program is executed and a processor return related to the microarchitecture instruction is intercepted. In response to the processor return, a second clock cycle indicative of the processor after executing the benchmark program is captured. The simulation environment determines the performance of the processor from the first clock cycle and the second clock cycle.

9 Claims, 5 Drawing Sheets

(56) References Cited

U.S. PATENT DOCUMENTS

| | | |
|---|---|---|
| 7,346,481 B1 | 3/2008 | Ballagh et al. |
| 7,770,140 B2 | 8/2010 | Bell et al. |
| 7,844,928 B2 | 11/2010 | Bell et al. |
| 7,904,870 B2 | 3/2011 | Bell, Jr. et al. |
| 8,010,334 B2 | 8/2011 | Bell et al. |
| 8,170,859 B1 | 5/2012 | Christensson et al. |
| 8,181,169 B2 | 5/2012 | Nakaike et al. |
| 8,230,059 B1 | 7/2012 | Santos et al. |
| 8,301,864 B2 | 10/2012 | Wang et al. |
| 8,448,140 B2 | 5/2013 | Isshiki et al. |
| 8,630,836 B2 | 1/2014 | Wasser |
| 8,799,870 B2 | 8/2014 | MacLellan et al. |
| 2004/0250150 A1* | 12/2004 | Swoboda .................. G06F 7/38 713/330 |
| 2005/0010908 A1* | 1/2005 | Funk .................. G06F 11/3648 717/124 |
| 2005/0289485 A1* | 12/2005 | Willis ............ G01R 31/318364 716/104 |
| 2006/0074970 A1 | 4/2006 | Narayanan et al. |
| 2006/0248410 A1 | 11/2006 | Circello et al. |
| 2007/0005322 A1 | 1/2007 | Patzer et al. |
| 2007/0005323 A1 | 1/2007 | Patzer et al. |
| 2008/0222384 A1 | 9/2008 | Wang et al. |
| 2009/0119089 A1 | 5/2009 | Gheith et al. |
| 2009/0199138 A1 | 8/2009 | Bell et al. |
| 2009/0276190 A1 | 11/2009 | Bell, Jr. et al. |
| 2009/0276191 A1 | 11/2009 | Bell, Jr. et al. |
| 2011/0078389 A1* | 3/2011 | Patel ........................ G06F 9/32 711/154 |
| 2011/0113224 A1 | 5/2011 | Isshiki et al. |
| 2012/0260073 A1* | 10/2012 | Henry ................. G06F 9/30174 712/221 |
| 2013/0346046 A1 | 12/2013 | Rompaey et al. |
| 2013/0346682 A1 | 12/2013 | Zeffer |
| 2014/0088734 A1 | 3/2014 | Narutani et al. |

FOREIGN PATENT DOCUMENTS

| | | |
|---|---|---|
| JP | 201322415 A | 10/2013 |
| JP | 5403760 B2 | 1/2014 |
| JP | 2014102734 A | 6/2014 |
| WO | 2010001766 A1 | 7/2010 |

OTHER PUBLICATIONS

Siegel, Timothy J., et al. "IBM's S/390 G5 microprocessor design." IEEE micro 19.2 (1999): 12-23. (Year: 1999).*

Dominguez, J. et al., "Methodology for Comparing the Execution Time of Metaheuristics Running on Different Hardware," Evolutionary Computation in Combinational Optimization, Lecture Notes in Computer Science, vol. 7245, 2012, pp. 1-12.

Hennet, P., "Measurement of Execution Unit Cycles Per Instruction Via Alternating Recording," IP.com Disclosure No. IPCOM000045158, Original Publication Date: Feb. 1, 1983, IP.com Electronic Publication: Feb. 6, 2005, pp. 1-4.

Zhang, Y. et al., "A quantitative performance analysis model for GPU architectures," High Performance Computer Architecture (HPCA), 2011 IEEE 17th International Symposium on , vol., No., pp. 382-393, Feb. 12-16, 2011 doi: 10.1109/HPCA.2011.5749745.

Eckmann et al., "Measuring Execution Time of Benchmark Programs in a Simulated Environment," U.S. Appl. No. 14/601,468, filed Jan. 21, 2015.

List of IBM Patents or Patent Applications Treated as Related, Oct. 20, 2015, 2 pages.

Slegel et al., "IBM's S/390 G5 Microprocessor Design", IEEE Micro, vol. 19., No. 2, pp. 12-23, Mar./Apr. 1999.

* cited by examiner

MEASURING EXECUTION TIME OF BENCHMARK PROGRAMS IN A SIMULATED ENVIRONMENT

BACKGROUND

The present disclosure relates to measuring computer processor performance, and more specifically, to instrumenting benchmark programs with microarchitecture instructions.

Measuring the performance of computer processors typically occur by way of one or more benchmark programs. The benchmark programs instruct the processor to perform a series of tasks that stress the capabilities of the processor. Because the benchmark program provides the same instructions to different processors, the performance of the differing processors may be compared. Typically, the performance of differing processors may be measured by measuring the time it takes to complete the benchmark program. The processors may also be measured by counting the number of processing cycles that a processor takes to complete the benchmark program.

SUMMARY

Embodiments of the disclosure may include a method, a system, and a computer program product for measuring performance of a processor in a simulation environment. A code segment of a benchmark program is instrumented with a microarchitecture instruction. A first clock cycle indicative of the processor before executing the benchmark program is captured. The code segment and benchmark program are executed by the processor and a processor return related to the microarchitecture instruction is intercepted. In response to the processor return, a second clock cycle indicative of the processor after executing the code segment is captured. The simulation environment determines a performance characteristic of the processor from the first clock cycle and the second clock cycle.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
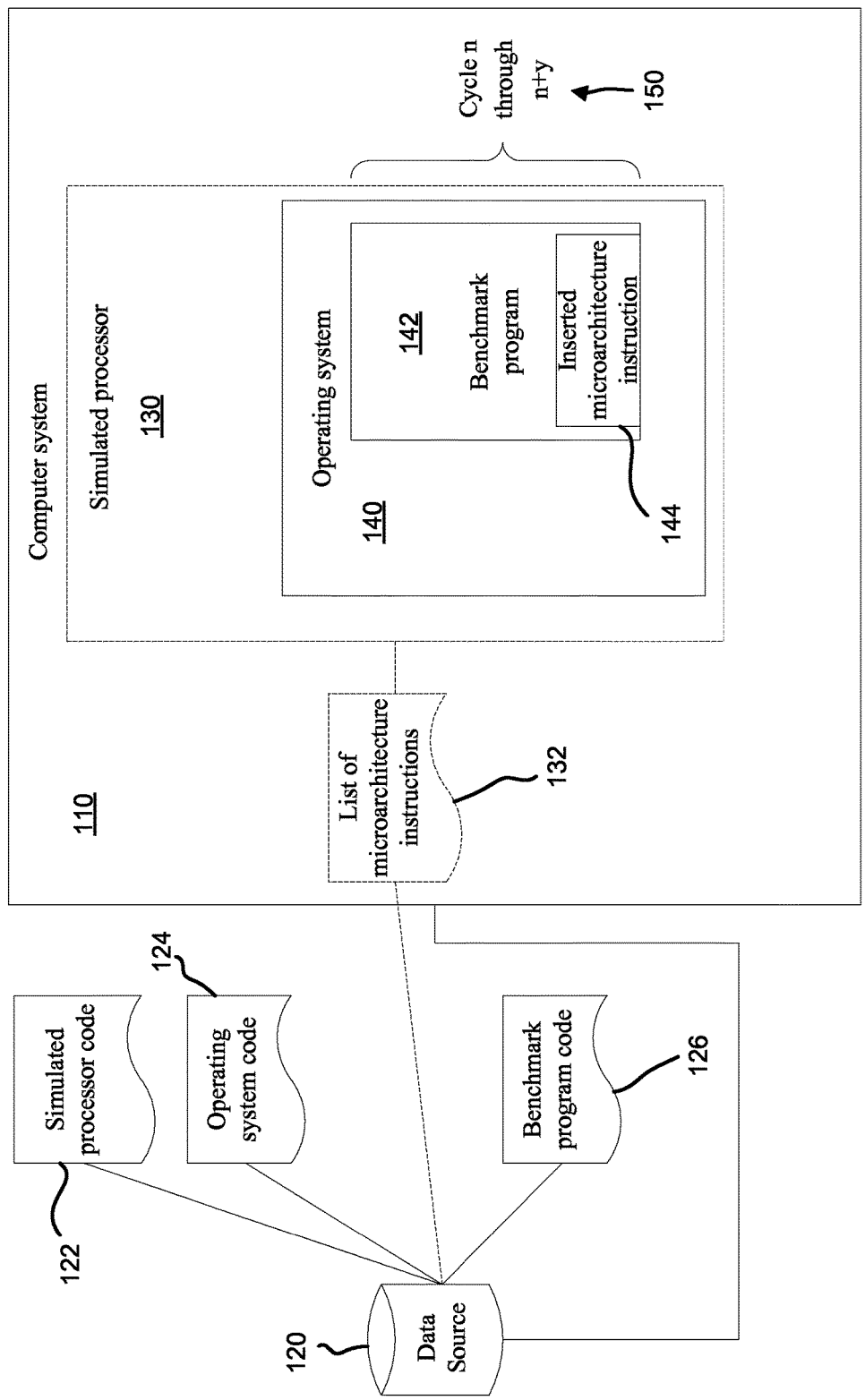
FIG. 1 depicts an example simulation environment utilized in some embodiments of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to benchmarking processors, more particular aspects relate to measuring performance of microprocessors by instrumenting microarchitecture instructions and counting processing cycles. While the present disclosure is not necessarily limited to such applications, various aspects of the disclosure may be appreciated through a discussion of various examples using this context.

In electrical and computer engineering, measuring processor performance is vital for processor designers during design and development of a microprocessor (alternatively, processor). Processor performance is usually measured by the amount of time it takes a processor to complete one or more tasks. Obtaining accurate information about a processor's performance allows processor designers to alter the basic layout of a processor in ways that yield increasing performance. Because processor design is costly, once a processor is mass produced for use as a central processing unit the design will not normally be altered until a subsequent processor is designed. Thus, processor designers must ensure processor performance is verified across one or more scenarios the processor will encounter during its lifetime. Additionally, other entities rely on understanding the performance of a processor, including operating system architects and compiler designers.

Measuring the performance of a newly designed processor may be accomplished by manufacturing a sample processor. The sample processor will be created using the same techniques that a finalized processor traverses when the finalized processor is mass produced. The sample processor may then be benchmarked by running one or more programs. There are many drawbacks, however, in creating a sample processor. First, the lag time to go from a newly designed processor to a sample processor may be months. Second, the manufacture of the sample processor may utilize a large and inefficient amount of exotic raw materials (such as silicon germanium and gallium arsenide). Third, the processor may be intended for a new die-size that is untested.

All three of these drawbacks result in sample processors that cost significant amounts of time and money. Processor designers do not have the ability to make a change to a newly designed processor, then wait to test if a sample processor incorporating the change results in better performance characteristics. In addition, operating system architects and compiler designers are unlikely to have access to a sample processor at any point before a newly designed processor is manufactured.

Processor designers have come to rely increasingly on testing processors in a virtual (or simulation) environment. In the virtual environment the processor (herein, virtualized processor) is simulated by a computer. This allows users to design, implement, and test a virtualized processor (or simulated processor), then alter the design and test again. A drawback to the simulation environment is that the virtualized processor runs much slower than a sample processor.

Often times any application running on the virtualized processor runs orders of magnitude slower than the sample processor. This is magnified when processor designers are trying to run benchmark programs. This makes benchmarking processors in a virtual environment difficult. Because the benchmarks take such an extended amount of time, processor designers cannot compare the results with existing processors. Additionally, because some benchmarks take several orders of magnitude longer to complete, processor designers must alter the benchmark. The altered benchmark allows processor designers to more quickly measure performance and thus iterate processor designs. However, the altered benchmark may not provide an accurate test of all the capabilities of the newly designed processor.

There are alternatives to time-based measurements of physical processors. One method that produces reliable and comparable results is to measure the clock-cycles of a physical processor. In detail, first the benchmark is instrumented by placing a break-point at the end of the benchmark. Next, the current clock-cycle is retrieved from the physical processor, and the physical processor is instructed to execute the benchmark program. After execution of the benchmark, execution stops at the inserted break-point and the current clock-cycle is again retrieved. Finally, by subtracting the clock-cycles before the physical processor executes the benchmark from the clock-cycles after the physical processor executes the benchmark, a cycle-count may be determined.

This cycle-count may be used to compare physical processors with each other. But, because of the simulation environment this is normally not applicable to virtualized processors. In the simulation environment the virtualized processor is being instrumented by the simulation environment. The simulation environment can watch the virtualized processor as it executes its instruction set architecture (herein, ISA) including calling any microcode or millicode instruction. Unfortunately, because the operating system and the benchmark program may be binary programs, the simulation environment cannot tell when execution of either the operating system or the benchmark program begins or ends. Additionally, the operating system may vary in the amount of tasks or the order the tasks that are performed before reporting the completion of the benchmark program. Thus, the simulation environment cannot reliably determine the cycle-count because there is no consistent way to obtain the clock-cycles of the virtualized processor after the execution of the benchmark program.

The use of a microarchitecture break-point may enable processor designers to repeatedly and reliably measure the performance of processors. The microarchitecture break-point may be used in a simulation environment to measure a virtualized processor, or in a live environment with a real processor. The simulation environment may run unaltered benchmarks, such as those conventionally used in a live environment. The simulation environment may also run altered benchmarks. The simulation environment may allow processor designers to consistently determine the cycle-count of a processor.

The microarchitecture break-point may be utilized to instrument a benchmark program. The microarchitecture break-point may be inserted at the end of the benchmark program. When the processor executes the microarchitecture break-point, the processor may call a microarchitecture instruction outside of the operating system and the benchmark program running on the processor. The cycle-count at the microarchitecture instruction may be determined. The microarchitecture break-point may be placed in the middle of the benchmark program. Multiple microarchitecture break-points may be placed in the middle or at the end of the benchmark program.

The microarchitecture break-point may be a microcode instruction. The microarchitecture break-point may be a millicode instruction. The microarchitecture break-point may be microarchitecture instructions other than microcode or millicode instructions. The microarchitecture break-point may be a default instruction, such as an error code. The error code may be indicative that a microarchitecture instruction is not defined or does not otherwise exist. The microarchitecture break-point may utilize a microarchitecture instruction that is part of a processor's functional ISA. The microarchitecture break-point may utilize a microarchitecture instruction that is not part of the processor's functional ISA (e.g., a microarchitecture instruction utilized for debugging the processor). The microarchitecture break-point may be determined by analyzing which microarchitecture instructions that are part of a processor's functional ISA are not utilized by an operating system or benchmark program.

The microarchitecture instruction may be located in read-only memory. The microarchitecture instruction may be located in read-write memory. The microarchitecture instruction may be located outside of the processor (e.g., SRAM, flash memory, etc.). The microarchitecture instruction may be located in the processor (e.g., a control store, a jump table, etc.). The microarchitecture instruction may be selected from a set of microarchitecture instructions, some of which are located inside the processor while others are located outside of the processor. The microarchitecture instruction may be loaded from a low-level operating system (i.e., a BIOS) or a high-level operating system. The microarchitecture instruction may be loaded from a simulation environment.

FIG. 1 depicts an example simulation environment 100 in accordance with embodiments of the invention. The simulation environment comprises the following: a computer system 110, a data source 120 that stores programs and other data, a simulated processor 130 running on the computer system, and an operating system 140 that is executed by the simulated processor. The simulation environment 100 may determine the performance of simulated processor 130 by calculating a cycle-count 150. The components of the simulation environment 100 may communicate with each other directly or through a network (not depicted). The simulation environment 100 may comprise additional details or features not depicted, and it should be appreciated that the simulation environment is provided for exemplar purposes only.

The computer system 110 may load data relevant to determining the performance of the simulated processor 130 from the data source 120. The data source 120 may contain simulated processor code 122, operating system code 124, and benchmark program code 126. The data source 120 may contain other code or data not depicted, such as other benchmark programs, benchmark program results, or other simulated processors. The data source 120 may also contain a list of microarchitecture instructions 132. The computer system 110 may load the simulated processor 130 from the data source 120. The computer system 110 may instruct the simulated processor 130 to load the operating system 140. The computer system 110 may be comprised of one or more hardware components (not depicted)—including the components depicted in FIG. 5.

The simulated processor 130 of the simulation environment 100 executes the operating system 140 and also the benchmark program 142. The simulated processor 130 may be a desktop processor and the operating system 140 may be any desktop operating system including Windows, Macintosh, or Linux. In some embodiments, the simulated processor 130 may be a mobile device processor and the operating system 140 may be any mobile operating system including iOS, Android, or Windows Phone. The simulated processor 130 may include a list of microarchitecture instructions 132 used by the simulated processor to provide the operating system 140 with an ISA. The list of microarchitecture instructions 132 may be loaded by the computer system 110 to the simulated processor 130. In some embodiments, the list of microarchitecture instructions 132 may be loaded from the data source 120.

The benchmark program 142 is executed by the simulated processor 130 through the operating system 140. To determine performance of the simulated processor 130 the benchmark program 142 may be instrumented with an inserted microarchitecture instruction 144 from the list of microarchitecture instructions 132. The inserted microarchitecture instruction 144 may be inserted at the end of the benchmark program 142. The inserted microarchitecture instruction 144 may be inserted in the middle of the benchmark program 142. In some embodiments, a second inserted microarchitecture instruction (not depicted) may be inserted into the benchmark program 142.

The performance of the simulated processor 130 may be determined by calculating the cycle-count 150. When the simulated processor 130 executes the operating system 140 and the benchmark program 142, the computer system may not be able to examine the benchmark program until after execution of the operating system ceases. But, when the benchmark program 142 calls the inserted microarchitecture instruction 144, the computer system 110 knows the status of the simulated processor's execution. At this point the computer system 110 may determine the cycle-count 150.

The cycle-count 150 may utilize a clock-cycle of the simulated processor 130 before execution of the benchmark program 142 and the clock-cycle of the simulated processor after execution of the inserted microarchitecture instruction 144. For example, the benchmark program 142 begins at a clock-cycle "n" of the simulated processor 130. While the simulated processor 130 is executing the benchmark program 142, the simulated processor is also executing the operating system 140. As the simulated processor 130 is performing the executions the clock-cycles are increasing. When the simulated processor 130 reaches the end of execution of the benchmark program, the simulated processor executes the inserted microarchitecture instruction 144. Upon execution of the inserted microarchitecture instruction 144 the simulated processor has gone through "y" clock-cycles. At this point the simulated processor 130 will leave the benchmark program 144 and the operating system 140 to access the microarchitecture instruction from the list of microarchitecture instructions 132. The computer system 110 will monitor this access and know that the benchmark program has finished execution by the simulated processor 130. At this point the computer system 110 knows that the benchmark program 142 began execution at clock-cycle "n" and the benchmark program ended execution at clock-cycle "n+y."

Figure 2:
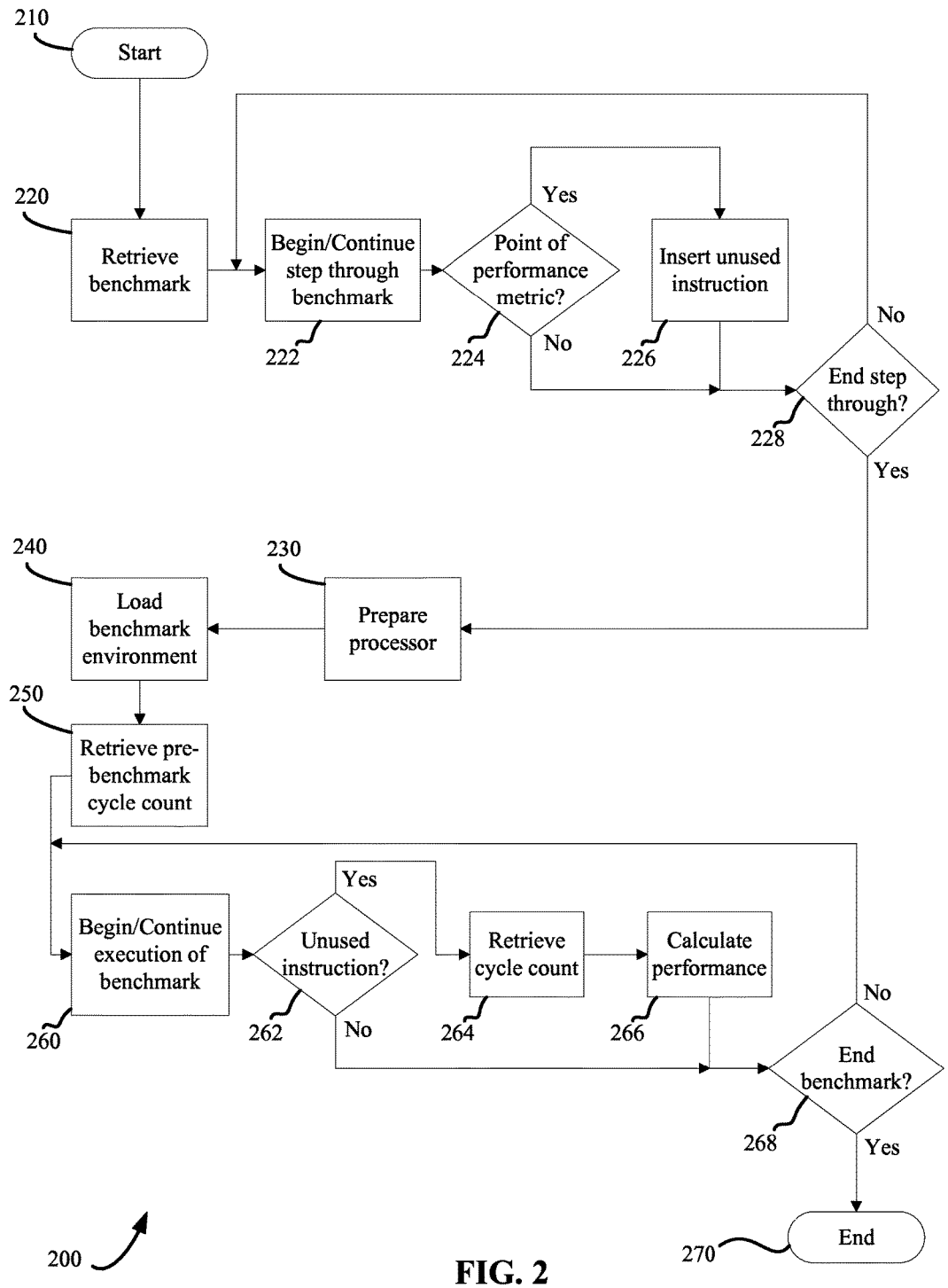
FIG. 2 depicts an exemplar method for determining the performance of a processor consistent with embodiments of the invention.

FIG. 2 depicts an exemplar method 200 for determining the performance of a processor. Method 200 may be utilized to determine the performance of a physical processor. Method 200 may also be utilized to determine the performance of a simulated processor. Because method 200 utilizes cycle-counts, the performance of physical processors and simulated processors may be compared. In some embodiments, a method different than method 200 may be utilized to determine the performance of a processor. The method 200 may be executed by a computer system.

From start 210, the benchmark may be retrieved, at 220, by the computer system. Next, the computer system steps through the benchmark, at 222, line-by-line until reaching a point of interest at 224 for a potential performance metric. In some embodiments, the point of interest is a certain segment of the benchmark program. In some embodiments, the point of interest is the entire benchmark program. Once a point of interest is identified, at 224, an unused microarchitecture instruction is inserted, at 226, just after the point of interest. If the benchmark has been stepped through in its entirety, at 228, then the computer system, proceeds to ready the processor at 230. If the benchmark has not been stepped through in its entirety, at 222 and 228, then again line-by-line the program is analyzed for points of interest at 224.

In some embodiments, the steps 220-228 may be performed by a user in conjunction with the computer system. For example, a user determines one or more sections of a benchmark program that are relevant in determining the performance of a processor. The user will place an unused microarchitecture instruction into the benchmark program before each section. The user will also place an unused microarchitecture instruction into the benchmark program after each section.

After the end of the step through, the computer system prepares the processor at 230. The preparation of the processor, at 230, may include allocation of resources from the computer system (e.g., memory and processing cycles). In some embodiments wherein the processor is a physical processor, the preparation of the processor, at 230, includes providing power and loading a low-level operating system (i.e., a BIOS) that initializes the processor. Next, the benchmark environment is loaded at 240. The benchmark environment may include an operating system and the benchmark program that has been instrumented with the microarchitecture instructions. In some embodiments, the benchmark environment may include additional tasks designed to stress the processor and allow performance of cache hierarchies, multi-threading, or other performance characteristics of the processor to be observed.

Next, the cycle-count of the processor is retrieved, at 250, and execution of the benchmark program commences at 260. The cycle-count of the processor, at 250, may be just before the benchmark program is executed. In some embodiments, the cycle-count of the processor, at 250, may be during the initial stages of execution of the benchmark program. In some embodiments, the cycle-count of the processor may be retrieved, at 250, by forcing the processor to execute another unused microarchitecture instruction (not depicted). When the processor executes the other unused microarchitecture instruction, the computer system may retrieve the cycle-count of the processor before execution of the benchmark program.

During execution of the benchmark program, at 260, the processor will reach the inserted unused microarchitecture instruction and the computer system will detect this instruction. If an unused microarchitecture instruction is reached, at 262, the computer system will retrieve the cycle-count at 264. The computer system may calculate the performance of the processor, at 266, by subtracting the cycle-count retrieved at 250 from the cycle-count retrieved at 264. If the processor has reached the end of the benchmark, at 268, the method 200 ends at 270. If the processor has not reached the end of the benchmark, at 268, the processor will continue the benchmark and the computer system will continue to monitor for unused microarchitecture instructions at 262.

Figure 3:
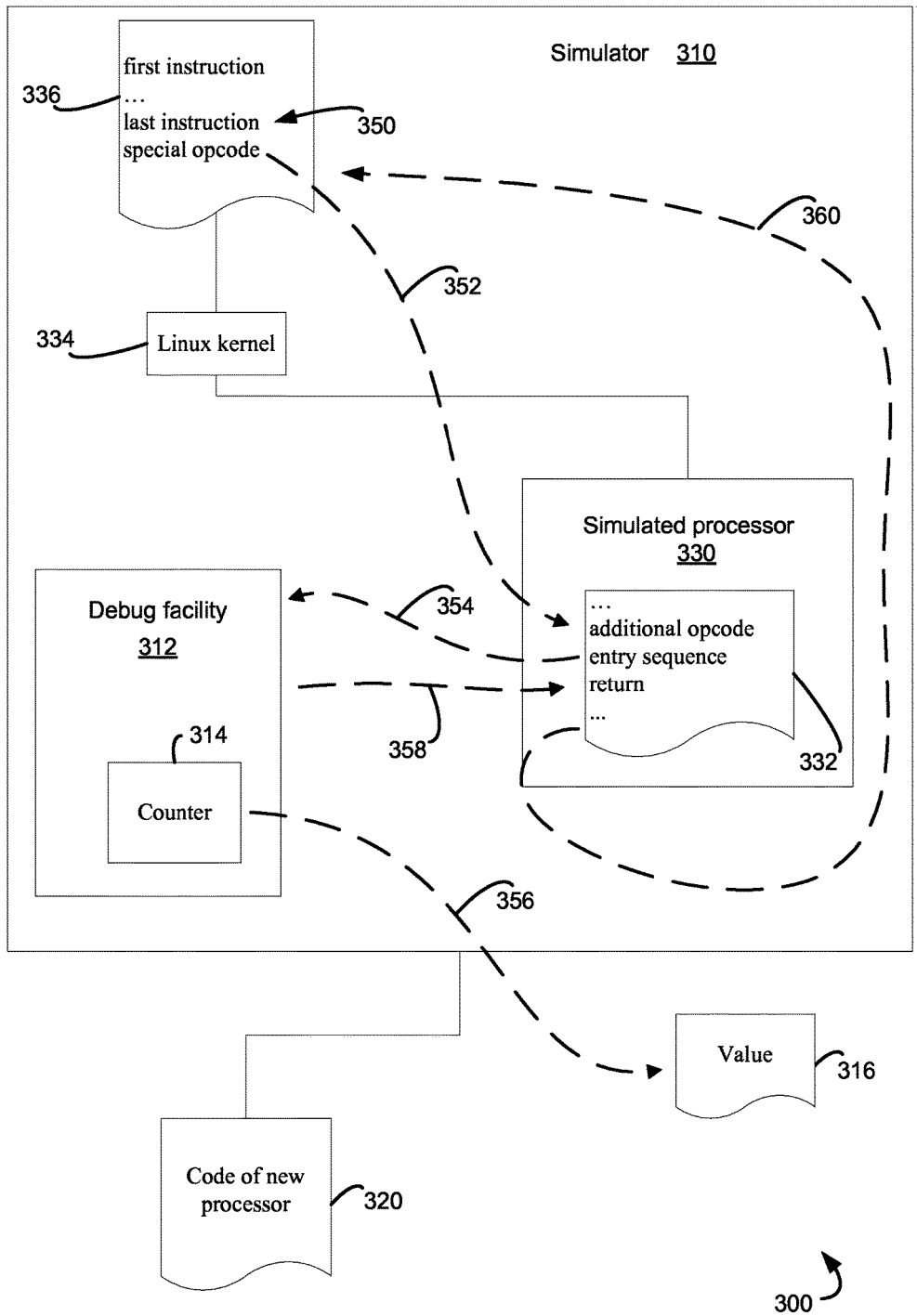
FIG. 3 depicts an example of a simulation environment performing the steps of debugging the processor consistent with embodiments of the invention.

FIG. 3 depicts an example of a simulation environment 300 performing the steps of debugging the processor consistent with embodiments of the invention. The simulation environment 300 comprises a simulator 310, a set of code 320, and a simulated processor 330. The simulation environment 300 may allow a user to instrument benchmark programs with microarchitecture instructions. After instrumenting the benchmark programs, a user may determine the cycle-count of the processor 330 from the simulation environment 300. The cycle-count of the processor 330 may be compared with the cycle-count of other processors that have run the benchmark program.

The simulator 310 may include a debug facility 312 that provides break-point management. The debug facility 312 may include a counter 314 that records cycles of the simulated processor 330 as the simulated processor performs tasks. The simulator 310 may store one or more counter values 316 that refer to the cycle-count of the simulated processor 330. The simulator 310 loads the simulated processor 330 from the set of code 320. The set of code may be in a compiled format. In some embodiments, the set of code 320 may be in the form of a hardware description language (e.g., VHDL). The simulated processor 330 may include millicode 332 that contains an opcode branch table. The simulated processor 330 may execute a linux kernel 334. The simulated processor 330 may also execute a benchmark program 336. The benchmark program may be in the form of binary code that has been precompiled with a special opcode. The simulated processor may run the benchmark program 336 by way of the linux kernel 334. For example, the benchmark program 336 is a process running from the linux kernel 334.

As the simulation environment 300 performs the benchmark program 336, one or more of the following steps may occur. It should be appreciated that the steps disclosed are for exemplar purposes and that other or different steps may occur. The disclosed steps may occur in another order, may be repeated, may differ in scope, and may differ in number. As the benchmark program 336 runs the last instruction is completed at 350. Next, the special opcode gets executed and causes a jump into the millicode branch table at 352. The millicode entry sequences gets executed, and the break-point is triggered at 354. After the break-point is triggered at 354, the debug facility 312 takes control and outputs the counter value at 356. Next, the debug facility returns control to the millicode 332 of the simulated processor 330 at 358. Finally, the millicode 332 returns to the benchmark program at 360.

Figure 4:
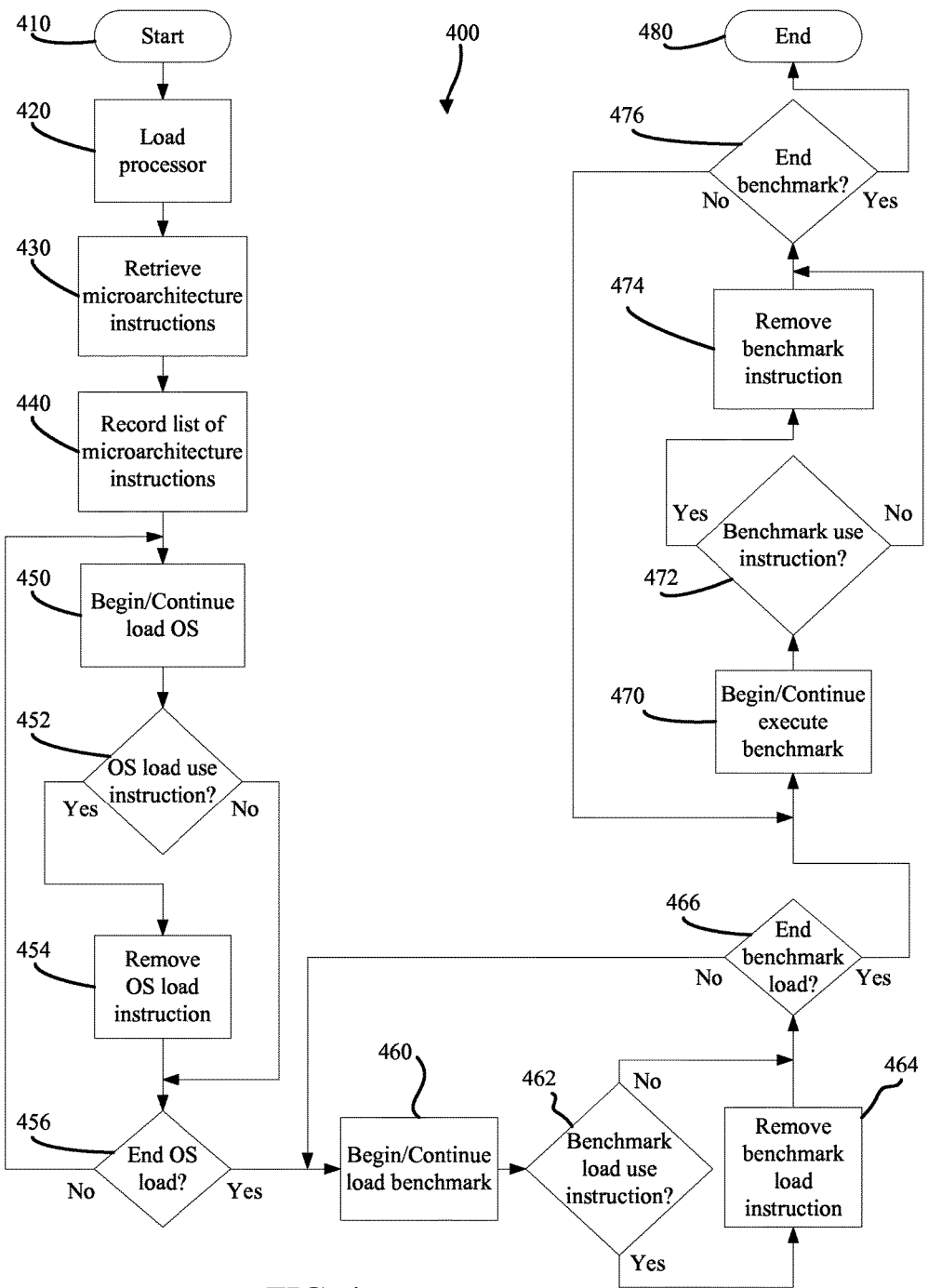
FIG. 4 depicts an exemplar method for determining a list of unused microarchitecture instructions for use in various embodiments of the invention.

FIG. 4 depicts an exemplar method 400 for determining unused microarchitecture instructions. In some embodiments, a user may not know which microarchitecture instructions are used for debugging or are otherwise available for instrumentation of a benchmark program. Method 400 may allow the user to determine one or microarchitecture instructions not utilized by the operating system or the benchmark program being executed by the newly developed processor.

From start 410, a processor is loaded, at 420, by a computer system and initialized. After loading the processor, all of the microarchitecture instructions associated with the processor and its ISA may be retrieved at 430. In some embodiments, the act of initializing the processor may involve retrieval of microarchitecture instructions. For example, when a bug is found in a processor, a processor vendor will release an updated set of microcode. A motherboard manufacturer may incorporate the updated set of microcode into an updated BIOS. After a user downloads and updates a motherboard with the updated BIOS, the motherboard's BIOS will update the processor at boot with the updated microcode. Thus, when the computer system instructs the motherboard to load the processor, the updated microcode can be retrieved. It should be appreciated that both physical and simulated processors can utilize updated microcode as discussed in the example above.

At 440, a list of microarchitecture instructions are recorded by the computer instructions. The list may be comprised of all of the microarchitecture instructions loaded at 430. In some embodiments, the list may be comprised of additional microarchitecture instructions. For example, if an updated set of microarchitecture instructions no longer includes a certain microarchitecture instruction but the control store of the processor still has a reference to this excluded microarchitecture instruction. The referenced excluded microarchitecture instruction may be a potential unused microarchitecture instruction for instrumenting the processor.

After recording a list of microarchitecture instructions, the computer system instructs the processor to load an operating system at 450. During loading of the operating system, the computer system detects if the act of loading uses a microarchitecture instruction at 452. If the computer system does detect usage of a microarchitecture instruction, at 452, the computer system may remove that microarchitecture instruction from the list of microarchitecture instructions at 454. In some embodiments, the computer system may flag the operating system load-related microarchitecture instruction instead of removing it from the list of microarchitecture instructions. If the computer system does not detect usage of an operating system load-related microarchitecture instruction, at 452, the computer system will determine if the operating system has finished loading at 456.

If the processor has finished loading the operating system, at 456, the computer system will instruct the processor to load the benchmark program at 460. During loading of the benchmark program, the computer system detects if the act of loading uses a microarchitecture instruction at 462. If the computer does detect usage of a benchmark program load-related microarchitecture instruction, at 462, the computer system may remove the benchmark program load-related microarchitecture instruction from the list of microarchitecture instructions at 464. In some embodiments, the computer system may flag the benchmark program load-related microarchitecture instruction instead of removing it from the list of microarchitecture instructions. If the computer system does not detect usage of a benchmark program load-related microarchitecture instruction, at 462, the computer system will determine if the benchmark program has finished loading at 466.

If the processor has finished loading the benchmark program, at 466, the computer system will instruct the processor to execute the benchmark program at 470. During execution of the benchmark program, the computer system detects if the act of executing uses a microarchitecture instruction at 472. If the computer does detect usage of a benchmark program execution-related microarchitecture instruction, at 472, the computer system may remove the benchmark program execution-related microarchitecture instruction from the list of microarchitecture instructions at 474. In some embodiments, the computer system may flag the benchmark program execution-related microarchitecture instruction instead of removing it from the list of microarchitecture instructions. If the computer system does not detect usage of a benchmark program execution-related microarchitecture instruction, at 472, the computer system will determine if the benchmark program has finished executing at 476. If the benchmark program has finished executing, at 476, the method 400 will end at 480. At this point the list of microarchitecture instructions generated by method 400 are unused by the processor, and thus may be usable to instrument the benchmark program.

It should be appreciated that a microarchitecture instruction selected from the list of microarchitecture instructions generated by method 400 may be useful for placement at the end of the benchmark program. In embodiments where the benchmark program will be instrumented by a microarchitecture instruction placed before the end of the benchmark program, method 400 may not be applicable. For example, a user may desire to instrument a benchmark program by placing microarchitecture instruction at the beginning of a benchmark program. In this instance although any microarchitecture instruction selected from the list is not utilized by any operation, the microarchitecture instruction may still perform operations that alter or otherwise modify code within the simulated environment, including the simulated processor. Modification of the operation of the simulated processor may alter the execution of the benchmark program before it completes. If a user selects an instruction from the list of microarchitecture instructions generated by method 400, they may need to ensure this instruction does not otherwise alter execution of the benchmark program before completion and before a cycle-count can be retrieved.

Figure 5:
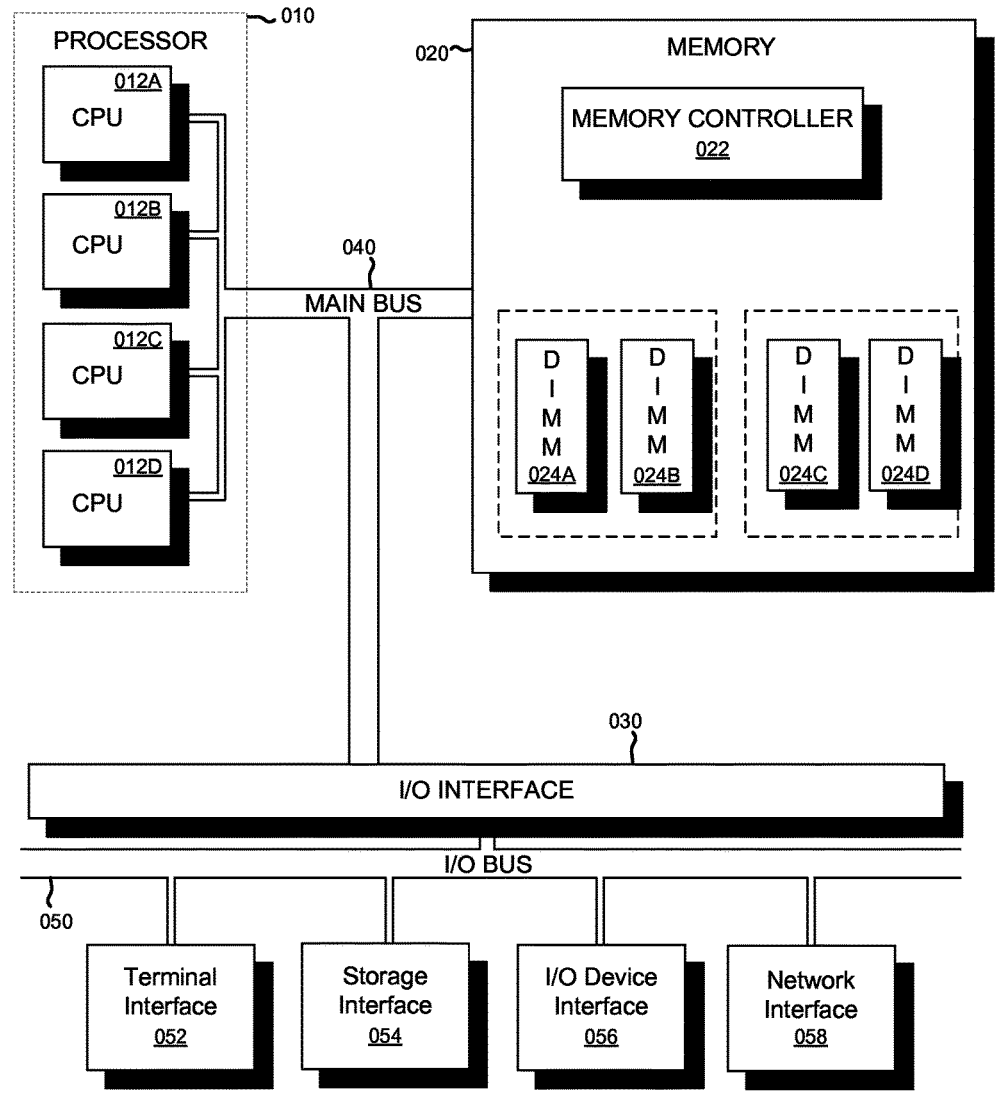
FIG. 5 depicts a high-level block diagram of an example system for implementing one or more embodiments of the invention.

FIG. 5 depicts the representative major components of an exemplary computer system 001 that may be used, in accordance with embodiments of the invention. It is appreciated that individual components may have greater complexity than represented in FIG. 5, components other than or in addition to those shown in FIG. 5 may be present, and the number, type, and configuration of such components may vary. Several particular examples of such complexities or additional variations are disclosed herein. The particular examples disclosed are for exemplar purposes only and are not necessarily the only such variations. The computer system 001 may comprise a processor 010, memory 020, an input/output interface (herein I/O or I/O interface) 030, and a main bus 040. The main bus 040 may provide communication pathways for the other components of the computer system 001. In some embodiments, the main bus 040 may connect to other components such as a specialized digital signal processor (not depicted).

The processor 010 of the computer system 001 may be comprised of one or more CPUs 012A, 012B, 012C, 012D (herein 012). The processor 010 may additionally be comprised of one or more memory buffers or caches (not depicted) that provide temporary storage of instructions and data for the CPUs 012. The CPUs 012 may perform instructions on input provided from the caches or from the memory 020 and output the result to caches or the memory. The CPUs 012 may be comprised of one or more circuits configured to perform one or methods consistent with embodiments of the invention. In some embodiments, the computer system 001 may contain multiple processors 010 typical of a relatively large system; however, in other embodiments the computer system may alternatively be a single processor with a singular CPU 012.

The memory 020 of the computer system 001 may be comprised of a memory controller 022 and one or more memory modules 024A, 024B, 024C, 024D (herein 024). In some embodiments, the memory 020 may comprise a random-access semiconductor memory, storage device, or storage medium (either volatile or non-volatile) for storing data and programs. The memory controller 022 may communicate with the processor 010 facilitating storage and retrieval of information in the memory modules 024. The memory controller 022 may communicate with the I/O interface 030 facilitating storage and retrieval of input or output in the memory modules 024. In some embodiments, the memory modules 024 may be dual in-line memory modules or DIMMs.

The I/O interface 030 may comprise an I/O bus 050, a terminal interface 052, a storage interface 054, an I/O device interface 056, and a network interface 058. The I/O interface 030 may connect the main bus 040 to the I/O bus 050. The I/O interface 030 may direct instructions and data from the processor 010 and memory 030 to the various interfaces of the I/O bus 050. The I/O interface 030 may also direct instructions and data from the various interfaces of the I/O bus 050 to the processor 010 and memory 030. The various interfaces may comprise the terminal interface 052, the storage interface 054, the I/O device interface 056, and the network interface 058. In some embodiments, the various interfaces may comprise a subset of the aforementioned interfaces (e.g., an embedded computer system in an industrial application may not include the terminal interface 052 and the storage interface 054).

Logic modules throughout the computer system 001—including but not limited to the memory 020, the processor 010, and the I/O interface 030—may communicate failures and changes to one or more components to a hypervisor or operating system (not depicted). The hypervisor or the operating system may be allocate the various resources available in the computer system 001 and track the location of data in memory 020 and of processes assigned to various CPUs 012. In embodiments that combine or rearrange elements, aspects of the logic modules capabilities may be combined or redistributed. These variations would be apparent to one skilled in the art.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for measuring processor performance in a simulation environment executed by a physical processor, the simulation environment executing one or more binary programs, the method comprising:
   instrumenting, by the simulation environment operating on the physical processor, a code segment of a benchmark program with a microarchitecture instruction otherwise unused by the benchmark program, the code segment and the benchmark program to be executed by a virtual processor, the unused microarchitecture instruction originally defined by the instruction set architecture of the virtual processor and utilized by the virtual processor to perform a function, wherein the benchmark program is a binary program;
   capturing, by the simulation environment operating on the physical processor, a first clock cycle of the virtual processor before execution of the benchmark program;
   intercepting, by the simulation environment operating on the physical processor, a processor return by the virtual processor, the processor return related to the unused microarchitecture instruction;
   capturing, by the simulation environment operating on the physical processor and in response to the intercepting of the processor return, a second clock cycle of the processor after the execution of the code segment; and determining, by the simulation environment operating on the physical processor, a performance characteristic of the virtual processor, the performance characteristic based on the first clock cycle and the second clock cycle.

2. The method of claim 1, wherein the microarchitecture instruction is a first microarchitecture instruction and the processor return is a first processor return, the method further comprising:
instrumenting, by the simulation environment operating on the physical processor, a second code segment of the benchmark program with a second microarchitecture instruction, the second code segment executed by the virtual processor;
intercepting, by the simulation environment operating on the physical processor, a second processor return by the virtual processor, the second processor return related to the second microarchitecture instruction;
capturing, by the simulation environment operating on the physical processor and in response to the intercepting of the second processor return, a third clock cycle of the virtual processor after the execution of the second code segment; and
determining, by the simulation environment operating on the physical processor and in response to the third clock cycle, a second performance characteristic of the virtual processor.

3. The method of claim 1, wherein the microarchitecture instruction is a microcode instruction.

4. The method of claim 1, wherein the microarchitecture instruction is a millicode instruction.

5. The method of claim 1, further comprising:
instructing, by the simulation environment operating on the physical processor, the virtual processor to load an operating system;
instructing, by the simulation environment operating on the physical processor, the virtual processor to load the benchmark program;
instructing, by the simulation environment operating on the physical processor, the virtual processor to execute the benchmark program; and
generating, by the simulation environment operating on the physical processor, a list of unused microarchitecture instructions, wherein the microarchitecture instruction is selected from the list of unused microarchitecture instructions.

6. The method of claim 1, wherein the processor return is a second processor return and the capturing the first clock cycle comprises:
instrumenting, by the simulation environment operating on the physical processor, the code segment of the benchmark program with a second microarchitecture instruction;
intercepting, by the simulation environment operating on the physical processor, a first processor return by the virtual processor, the first processor return related to the second microarchitecture instruction; and
capturing, by the simulation environment operating on the physical processor and in response to the intercepting of the first processor return, the first clock cycle.

7. A method for improved flexibility in comparing physical processors to virtual processors by using unused microarchitecture instructions originally defined by the instruction set architecture to perform functionality of the virtual processor and repurposed to perform functions of instrumentation, the method comprising:
instrumenting a code segment of a program, the code segment and the program to be executed by a physical processor;
capturing a first clock cycle of the physical processor before execution of the program;
causing the physical processor to execute the program;
capturing, based on the instrumentation, a second clock cycle of the physical processor after the execution of the code segment;
measuring, based on the first clock cycle and the second clock cycle, a physical processor cycle-count;
instrumenting the code segment of the program with a microarchitecture instruction otherwise unused by the program, the code segment and the program to be executed by a virtual processor, the unused microarchitecture instruction originally defined by the instruction set architecture to perform a first function of the virtual processor;
capturing a third clock cycle of the virtual processor before execution of the program;
causing the virtual processor to execute the program;
intercepting a second processor return by the virtual processor, the second processor return related to the unused microarchitecture instruction;
capturing, in response to the intercepting of the second processor return, a fourth clock cycle of the virtual processor after the execution of the code segment; and
measuring, based on the third clock cycle and the fourth clock cycle, a virtual processor cycle-count.

8. The method of claim 7, wherein the method further comprises:
determining, based on the physical processor cycle-count and based on the virtual processor cycle-count, that the virtual processor takes less processing cycles than the physical processor to execute the program.

9. The method of claim 7, wherein the method further comprises: determining, based on the physical processor cycle-count and based on the virtual processor cycle-count, that the physical processor takes less processing cycles than the virtual processor to execute the program.

* * * * *